(12) United States Patent
Burger et al.

(10) Patent No.: US 6,557,080 B1
(45) Date of Patent: Apr. 29, 2003

(54) CACHE WITH DYNAMIC CONTROL OF SUB-BLOCK FETCHING

(75) Inventors: Douglas C. Burger, Madison, WI (US); David A. Wood, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/490,842

(22) Filed: Jan. 25, 2000

Related U.S. Application Data
(60) Provisional application No. 60/117,148, filed on Jan. 25, 1999.

(51) Int. Cl.[7] .............................................. G06F 12/08
(52) U.S. Cl. ........................ 711/137; 711/144; 711/205
(58) Field of Search ................................ 711/137, 129, 711/133, 144, 156, 204, 205, 213; 712/207

(56) References Cited

U.S. PATENT DOCUMENTS

| | | | | |
|---|---|---|---|---|
| 5,796,971 A | * | 8/1998 | Emberson | 712/207 |
| 5,941,981 A | * | 8/1999 | Tran | 712/207 |
| 6,003,115 A | * | 12/1999 | Spear et al. | 711/137 |
| 6,055,621 A | * | 4/2000 | Puzak | 712/207 |
| 6,098,153 A | * | 8/2000 | Fuld et al. | 711/134 |
| 6,134,643 A | * | 10/2000 | Kedem et al. | 711/213 |
| 6,279,128 B1 | * | 8/2001 | Arnold et al. | 714/49 |

OTHER PUBLICATIONS

IBM Technical Disclosure Bulletin, Aug. 1986, "Prefetch Confirmation/Access Array", vol. 29, Issue No. 3.*

* cited by examiner

*Primary Examiner*—Gary Portka
(74) *Attorney, Agent, or Firm*—Quarles & Brady LLP

(57) ABSTRACT

A cache structure for computer architecture evaluates the subblocks actually used in the cache to modify the granularity of subsequent refreshes of the cache. When many subblocks are used, then subsequent fetches will load the entire block. If only a few subblocks are used, subsequent fetches will fetch only a single subblock. Discontinuous subblock fetching is provided for in a second embodiment in which an entire block is fetched if there is no correlation in the pattern of the subblock usage over time whereas a pattern of discontinuous subblocks is fetched if an historical pattern is revealed. A combination of these two embodiments may also be used.

14 Claims, 4 Drawing Sheets

CACHE WITH DYNAMIC CONTROL OF SUB-BLOCK FETCHING

CROSS-REFERENCE TO RELATED APPLICATIONS

This application is based on U.S. Provisional application No. 60/117,148 filed Jan. 25, 1999, incorporated by reference, and claims the benefit thereof.

STATEMENT REGARDING FEDERALLY SPONSORED RESEARCH OR DEVELOPMENT

This invention was made with United States government support awarded by the following agencies:

DODAF Grant No: F33615-94-1-1526

NSF Grant No(s): CCR-9509589; EEC-9633800; CCR-9157366; MIP-9625558

The United States has certain rights in this invention.

BACKGROUND OF THE INVENTION

The present invention relates to cache structures for computers and in particular to a cache structure that allows dynamic control of the size and configuration of the data block fetched by the cache from memory.

Standard electronic computers include a processor, executing arithmetic and logical instructions, and a memory system communicating with the processor and holding instructions and data used by the processor. Typically, the memory system will include a range of memory types from disk drives to solid state memory each reflecting a different trade-off between storage cost (per data word), access speed and ultimately storage capacity. A hierarchy is formed of these devices with data being moved from the generally larger and slower memory devices to the smaller and faster memory devices at times when frequent access to the data by the processor is needed.

Cache memory (henceforth termed "cache") is solid-state memory in direct communication with the processor typically both on and off the processor chip. Data is moved to the cache from a larger solid-state memory (henceforth termed "memory") to provide faster access to that data by the processor.

The effectiveness of cache depends on how well it is managed. Time saved by faster access between the processor and the cache can be lost if the desired data is not in the cache (a cache "miss") and an updating of the cache from the memory must be performed prior to the data being available to the processor.

For this reason, proper management of the cache attempts to ensure that data is moved to the cache from the memory prior to being needed by the processor. This can be done by moving not only the data requested by the processor, but also data having addresses near the address of the data requested by the processor. The expectation is that requests of data by the processor will cluster in address. The data moved to the cache upon a cache miss will be termed the "fetch block".

Larger fetch blocks reduce the number of cache misses (until cache pollution causes the miss rate to rise again). Larger fetch blocks, however, also increase the traffic between the memory and the cache reducing performance of the system. Accordingly, computer designers attempt to pick a fetch block size effecting a compromise between the competing requirements of minimizing cache misses and minimizing superfluous traffic between the memory and the cache.

BRIEF SUMMARY OF THE INVENTION

The present inventors have recognized that the tradeoffs between avoiding cache misses and minimizing data traffic between the cache and memory can be improved by dynamically changing the fetch block size based on historical measurement of the success of previous fetch block sizes in satisfying processor requests. The fetch blocks may include data from discontinuous address ranges.

The statistics about the success of a fetch block size will depend on the particular data contained in the fetch block (and thus generally the address of the data in the memory) and hence statistics about the fetch blocks must be linked to particular memory addresses. Nevertheless, simulations indicate that this storage overhead is justified for large cache sizes based on performance gains.

Specifically, the present invention provides a cache structure for a computer having a processor and associated memory. The cache structure includes a cache communicating with the memory for receiving data from the memory and communicating with the processor for providing data to the processor. The cache is divided into blocks, each holding data from an address range of the memory, and each block is divided into sub-blocks. The cache structure also includes a "subblock use table" having entries indicating which subblocks have had their data used by the processor since the block was loaded. A "fetch size controller" provides a fetch size value for a given address range of the memory based on the subblock use table for the data of the given address range. "Miss processing circuitry" responds to a request from the processor for data in a given address range (when the data are not found in the cache) by loading the requested data into a number of subblocks of a block of the cache determined by the fetch size value for that address range.

Thus it is one object of the invention to provide for a dynamically changing fetch block size for updating the cache based on statistical data as to how well a previous fetch block size was utilized by the processor. Generally, if the subblock use table shows a large number of subblocks of the block being accessed by the processor, a larger fetch block size is chosen.

The fetch size value may be a single bit and the number of subblocks may be selected from the group consisting of one subblock and all of the subblocks of the block.

Thus it is another object of the invention to provide for an extremely low overhead dynamic system in which only two sizes of fetch block are used.

The fetch size controller may determine the fetch size value by comparing the number of subblocks of the block of the cache having their data used by the processor against a predetermined threshold.

Thus it is another object of the invention to provide a simple metric for determining effectiveness of a fetch block size that may be used to decide dynamically the size of future fetch blocks for data of a particular memory address range.

The fetch size controller may determine the fetch size value for a given address range based on the subblock use table for data previously loaded for the given address range over several previous loadings of the given address range.

Thus it is another object of the invention to provide for a greater statistical base in making a dynamic fetch block size determination by looking at several cycles of use of data from a particular address range.

The fetch size controller may determine the fetch size value for a given address range based on whether the number of subblocks of the block of the cache having their data provided to the processors since the block was last loaded principally exceed or fall short of a predetermined threshold for a predetermined number of loadings of the given address range.

Thus it is another object of the invention to provide for a simple statistical evaluation of the success of different fetch block sizes that may be implemented in fast hardware and that may evolve with use toward increasing or decreasing fetch block size.

In an alternative embodiment, the cache and subblock use table may be associated with a "fetch pattern controller" which analyzes patterns of subblock use indicated by the subblock use table for a given address range to provide a fetch pattern associated with the given address range. In this case, the miss processing circuitry responds to a request from the processor for data of the given address range that is not in the cache by loading the requested data into particular subblocks of a block of a cache according to the fetch pattern and the request.

Thus it is another object of the invention to provide for a dynamic changing of fetch block size that does not require the subblocks having contiguous address ranges.

The fetch pattern may be the pattern of the entry of the subblock use table associated with the given address range including a subblock holding the requested data.

Thus it is another object of the invention to provide a simple determination of a fetch pattern when discontinuous subblocks are indicated but one that always includes the actual requested data from the processor.

The cache structure may include a "previous subblock use table" having at least one entry indicating which of the subblocks of the block of the cache have had their data provided to the processor since the block was previously loaded. The fetch pattern controller may then compare the patterns of the subblock use between the subblock use table and the previous subblock use table for a given address range to determine the fetch pattern.

Thus it is another object of the invention to provide a simple mechanism for evaluating historical correlations between successful fetch blocks holding discontinuous subblocks.

The fetch pattern controller may evaluate the hamming distance between the entries of the subblock use table and the previous subblock use table and compares that hamming distance to a predetermined threshold in determining the fetch pattern.

Thus it is another object of the invention to provide a simple metric for correlation of discontinuous subblock patterns that may be easily implemented at the chip level. As before, this process may be extended over a number of loadings of the cache for the given address range and may allow both for evolution toward discontinuous subblock fetching or continuous block fetching as the historical statistics would indicate.

The foregoing and other objects and advantages of the invention will appear from the following description. In this description, reference is made to the accompanying drawings, which form a part hereof, and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
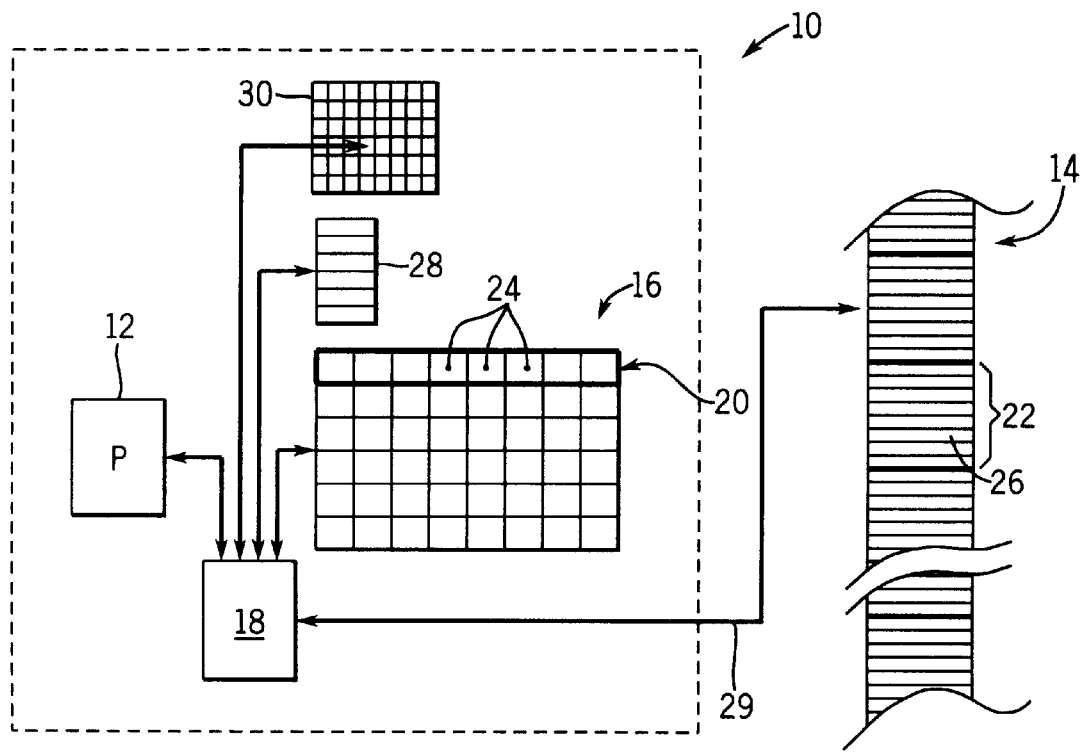
FIG. 1 is a simplified block diagram showing a prior art cache structure including a cache divided into blocks and subblocks with an associated tag memory and valid subblock table used by cache control circuitry to manage requests by the processor for data from the cache and to refresh the cache from memory according to techniques known in the art.

Referring now to FIG. 1, in prior art cache architecture 10, a processor 12 receives data from memory 14 via a cache 16 mediated by a cache control circuitry 18. As is generally understood in the art, the cache 16 may be divided into a number of blocks 20 having capacity to hold data of a memory address range 22 of memory 14. The block 20 may be divided into subblocks 24 having a smaller size encompassing a subrange 26 of the memory address range 22. Subblocks 24 may be distinguished from blocks 20 in that they are not associated with individual tags for each subblock 24 but assume the tag of their associated block 20. For this reason, the use of subblocks provides significant savings in tag memory in contrast to simply using smaller blocks 20.

The cache 16 is smaller than the memory 14 and thus each block 20 at different times holds different memory address ranges 22 of the memory 14. Data from these ranges when stored in the cache are distinguished by a tag associated with the block they are stored in, the tag held in tag memory 28.

Upon a request by the processor for data at a given address of the memory 14, the cache control circuitry 18 locates a relevant block 20 and subblock 24 of the cache 16 as implicitly identified from the given address. The cache control circuitry 18 then examines the tag memory 28 for a tag associated with a given block 20 distinguishing among the set of possible memory address ranges 22 that map to the given block 20. The cache control circuitry 18 performs its tasks according to hardwired programming as is understood in the art.

If the tag memory 28 indicates that the indicated block 20 (and thus subblock 24) holds the data desired by the processor 12, the cache control circuitry 18 goes to the valid subblock table 30, which holds a bit for each subblock 24 indicating whether the particular subblock 24 is still valid. If so, the cache control circuitry 18 provides the data from the subblock 24 to the processor 12 eliminating the need for access of slower memory 14. Within the subblock 24, an offset value of the address requested by the processor 12 is used to provide the processor with specific data it requested from out of the subblock 24.

On occasion, the data desired by the processor 12 will not be within the cache 16 as indicated by the tag memory 28 or the valid subblock table 30. In that case, the cache control circuitry 18 will fetch the necessary data directly from the memory 14 over memory bus 29. A single subblock 24 of the block 20 will be fetched at this time.

Figure 2:
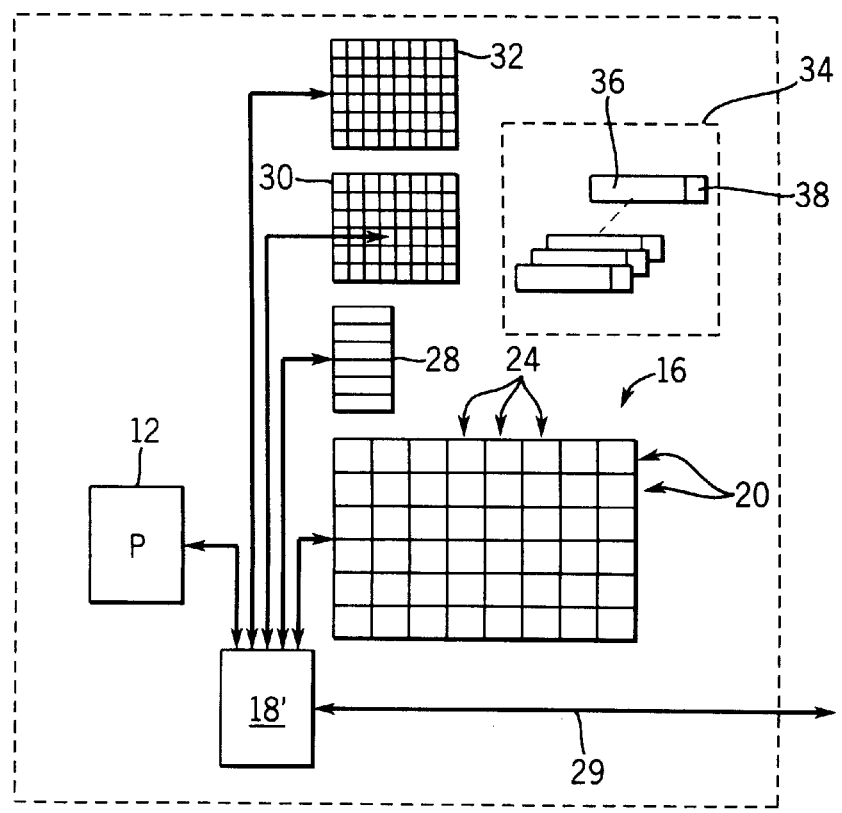
FIG. 2 is a figure similar to that of FIG. 1 showing the addition of a subblock use table per the present invention for evaluating the utilization of the block by the processor and address linked statistical data for determining the size of blocks to be fetched for the cache for particular addresses in the future.

Referring now to FIG. 2, the present invention adds a subblock use table 32 to the structure described above. Like the valid subblock table 30, the subblock use table 32 provides a bit for each subblock of the cache 16. This bit is set to indicate an actual accessing of data of the subblock 24 by the processor 12 once it has been loaded into the cache 16. The invention also adds a statistical data table 34 holding count values 36 and fetch size values 38 (as will be described) associated with each address range for a subset of the address range of the memory 14. These two additional structures of the subblock use table 32 and statistical data table 34 allow dynamic control of the size of the fetch block obtained from the memory 14 by the cache control circuitry 18' when there is a cache miss.

In the preferred embodiment of the invention, the size of the subblock 24 is determined by the "pollution point" to minimize the miss-ratio and the size of the block 20 is set to a "performance point". The performance point is the block size at which the overall system performance is highest. Blocks 20 larger than the performance point will cause reduced performance because of bus contention between the cache 16 and the memory 14 whereas blocks 20 smaller than the performance point will cause reduced performance because of more numerous misses. The pollution point represents the subblock size at which the miss-ratio, rather than absolute performance, is minimized. Subblocks smaller than the pollution point will cause more misses because they are not exploiting spatial locality as well. Pollution represents data in the cache that is never needed or data that are obtained too early and thus is ejected prior to its use.

Figure 4:
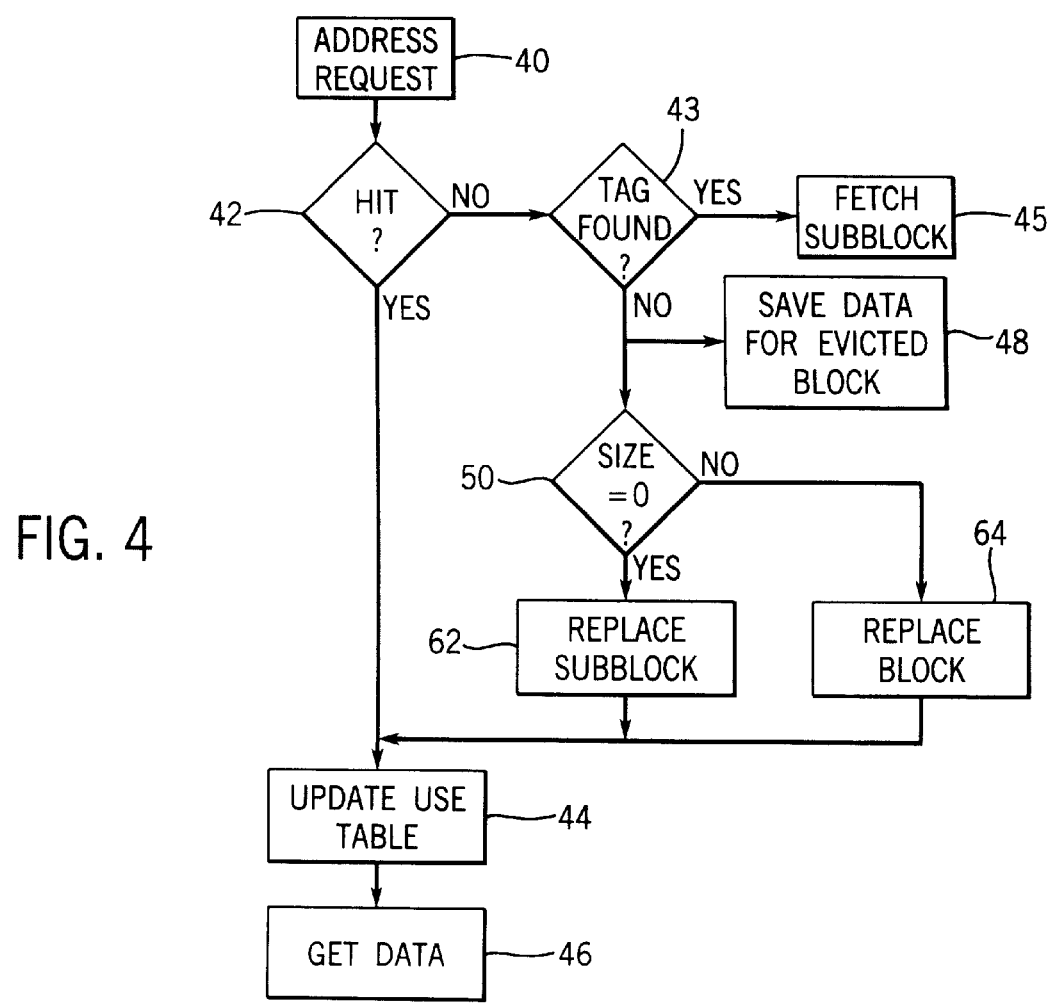
FIG. 4 is a flow chart showing operation of the cache control circuitry upon receiving an address request from the processor.

Referring now to FIG. 4, the operation of the cache control circuitry 18' begins as indicated by process block 40 with receipt of a request for data of a particular address of the memory 14 issued by the processor. The cache control circuitry 18' upon receiving this request, proceeds to process block 42 to determine whether that address is in the cache 16, a condition termed a cache hit. As described above, this determination is made by a review of the tag memory 28 and the valid subblock table 30.

Assuming that the requested data is in the cache 16, the cache control circuitry 18' proceeds to process block 44 and updates the subblock use table 32 for the particular subblock in which the data is located by setting the appropriate bit in the subblock use table 32 to one.

At succeeding block 46, the particular data requested by the processor, as determined by the offset of the address, is obtained from that subblock and provided to the processor.

If at decision block 42, there is a cache miss, the tag memory is examined at process block 43 to see if the block is loaded in the cache even if the subblock is not loaded. If the tag is found indicating that only the subblock is missing, the program proceeds to process block 45 and the subblock is fetched. On the other hand if the tag is not found at decision block 43, then the program proceeds to process blocks 48 and 50 for parallel execution of these steps as rendered possible by their implementation in circuitry.

Figure 3:
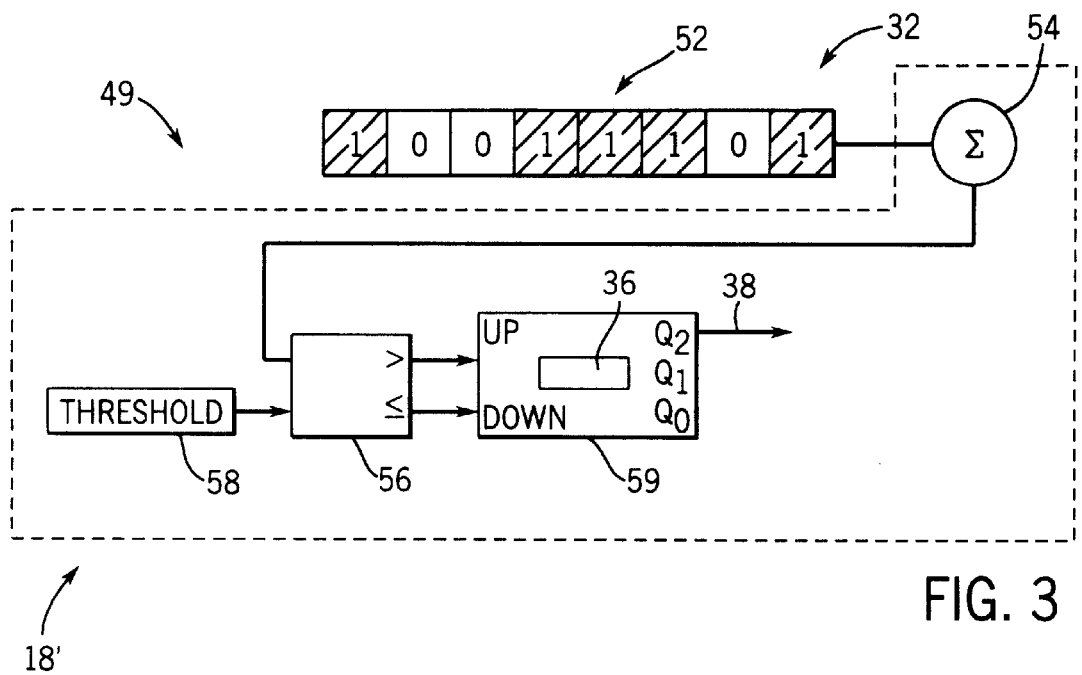
FIG. 3 is a block diagram of the operation of a fetch size controller being part of the cache control circuitry of FIG. 2 reading the subblock use table to update the statistical data.

At process block 48, the subblock use table 32 row associated with the block 20 in which a miss has occurred (the evicted block) is examined to extract statistical data that will be saved in the statistical data table 34 for the particular address range of the data of evicted block 20. Referring also to FIG. 3, this statistical data is obtained by a fetch size controller 49 being part of the cache control circuitry 18'.

The particular row 52 of the subblock use table 32 is examined to see how many ones are contained in that row indicating subblocks of the block 20 which held data that was actually obtained by the processor 12. These set bits are summed as indicated by summing block 54 and compared at magnitude comparator 56 to a predetermined threshold 58. The threshold may be set according to empirically derived data for a particular architecture including subblock 24 size.

The fetch size controller 49 also includes a saturating 3-bit up/down counter 59, which is loaded with the count value 36 from the statistical data table 34 for the particular address range of the data of that block 20 being evicted. Saturation means that the counter will count to its maximum value of seven and then will count no higher remaining at seven, and conversely will count down to its lowest value of zero, remaining there and counting no lower.

If the number of used subblocks 24 indicated by the summing block 54 is greater than the threshold 58, then counter 59 counts up once for that occurrence of process block 48. Conversely, if the result from the summing block 54 is less than the threshold, the counter 59 counts down once.

When the counter 59 has reached its maximum value, its most significant bit (the four's place) provides the fetch size value 38. Conversely, if counter 59 is less than its maximum value, then the most significant bit is zero causing the fetch size value 38 to become zero.

Upon completion of the incrementing or decrementing of counter 59 and setting or resetting if any of the fetch size value 38, the count value 36 and the fetch size value 38 are saved in the statistical data table 34 keyed to the particular address range represented by the data of the evicted block.

Once this data is saved, then the row 52 of the subblock use table 32 is reset to zero and the corresponding row of the valid subblock table 30 is set to zero and block 48 is concluded.

Referring still to FIG. 4 at block 50, the fetch size value 38 for the address range 22 now being loaded is recalled from the statistical data table 34 and the fetch size value 38 is checked to see whether it is a one or zero. If the fetch size value equals zero indicating that less than the threshold 58 of subblocks 24 were used in the previous loading of the block 20 associated with this address range, then at process block 62, the cache control circuitry 18 fetches from memory 14 only the subblock containing the address requested by the processor 12. In this way, low bus overhead is required.

On the other hand if at decision block 50 the fetch size value is one, then the process proceeds to process block 64 and the entire block 20 embracing the desired address range 22 is moved to the cache 16 from memory 14. In this way, the entire block 20 is obtained only if it is likely that many of its subblocks 24 will be used as based on historical evidence of previous loadings of the cache 16. The program then proceeds to process block 44 as has been described.

Figure 5:
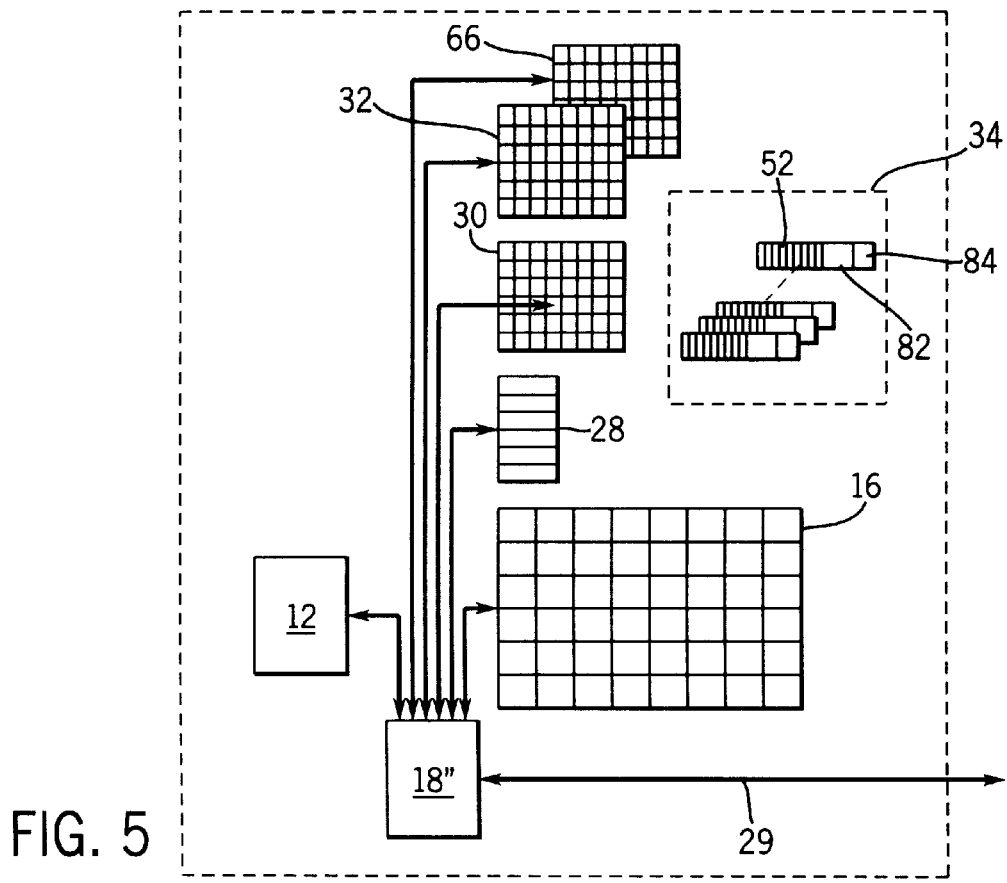
FIG. 5 is a figure similar to that of FIG. 2 showing an alternative embodiment of the present invention including both a subblock use table and a previous subblock use table used to provide discontinuous subblock fetching.

Referring now to FIG. 5, in an alternative embodiment, the subblock use table 32 is supplemented with a previous subblock use table 66 of identical size but indicating use of the subblocks 24 in a previous enrollment of the data of a particular block 20 for a particular address range 22. The data of the previous subblock use table 66 row is stored within statistical data table 34 for a given memory address range 22 when that data is evicted from the cache 16 (as will be described) and recalled when the data of that address range is again to be loaded into the cache 16.

Figure 7:
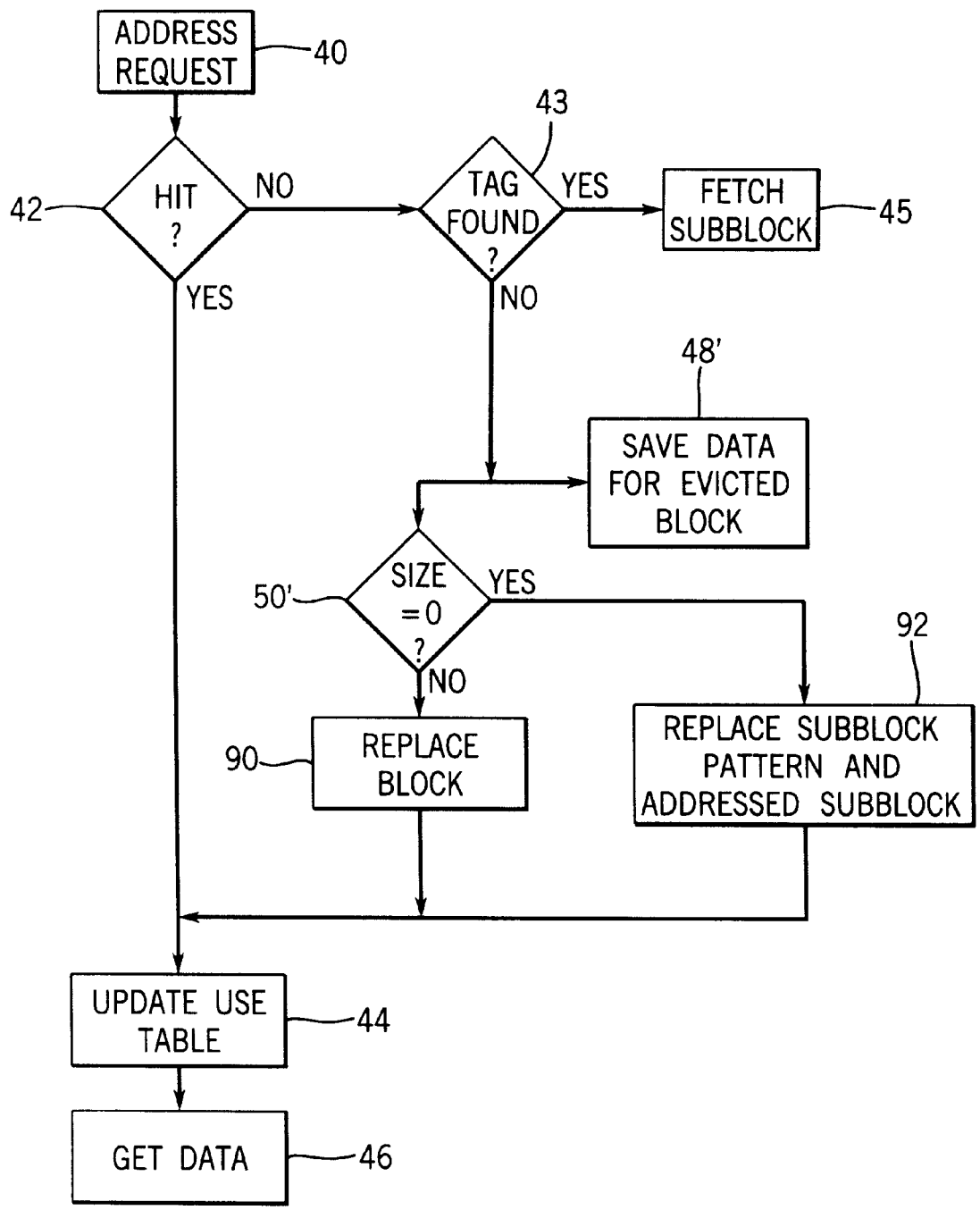
FIG. 7 is flow chart similar to that of FIG. 4 changed to accommodate discontinuous subblock fetching.

Referring now to FIG. 7, the cache control circuitry 18" like cache control circuitry 18', may receive a request for data from the processor 12 at process block 40 and at process block 42 may determine whether there has been a cache hit. If so, succeeding process block 44 and 46 update the subblock use table 32 and obtain the data for the processor 12 as has been previously described.

If, on the other hand, there is a cache miss at decision block 42, and the tag is not found at process block 43, then at process block 48' corresponding generally to process block 48 described above, statistical data for the evicted block 20 is saved. In this case, the data includes not only a count value 82 and a fetch size value 84 but also a row of the subblock use table 32 associated with the evicted data of block 20 which will provide the data of the previous subblock use table 66 (used later) establishing a pattern of usage of the subblocks 24 of the block 20 during its lifetime in the cache 16.

Figure 6:
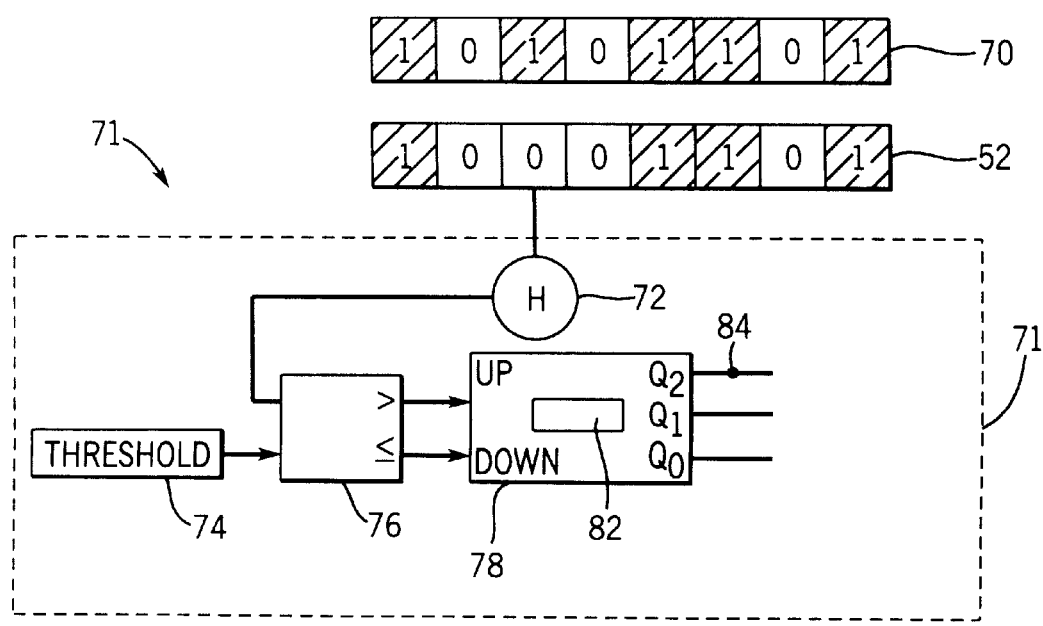
FIG. 6 is a figure similar to that of FIG. 3 showing operation of a fetch pattern controller being part of the cache control circuitry of FIG. 5 reading the subblock use table and previous subblock use table to determine a discontinuous subblock fetching pattern suitable for a particular memory address.

Referring now also to FIG. 6, a fetch pattern controller 71 implemented as part of the cache control circuitry 18" reviews the row 52 of the subblock use table 32 associated with the evicted block 20 and compares it with a corresponding row 70 from the previous subblock use table 66 indicating the use of the subblocks 24 when the block 20 for the same address range of memory 14 was last loaded into the cache 16.

Specifically, these two rows 70 and 52 are compared to evaluate their hamming distance using hamming distance circuit 72. Hamming distance represents the number of bits at which the pattern (ones or zeros) of the rows 70 and 52 differ. In the present example of FIG. 6, each row holds up to eight bits with row 70 having bit zero, two, four, five, and seven set and row 52 having bit zero, four, five, and seven set. The hamming distance for this example is one representing the failure to match for bits two in rows 70 and 52.

This hamming distance is compared to the threshold 74 by means of comparator 76 similar to comparator 56 described above. The output of the comparator 76, if the hamming distance is greater than the threshold 74, provides input to a counter 78 similar to counter 59 described above causing it to count up by one once for the execution of process block 48'. The counter 78 has been loaded with the count value 82 at the beginning of process block 48' so that its count represents a cumulative value over a number of cycles of the loading of cache block 20 with the data of the particular address range 22.

Conversely, if the threshold 74 is greater than the hamming distance, an output is provided to cause counter 78 to count down by one. The most significant bit of counter 78 provides the fetch size value 84. The count value 82 and the fetch size value 84 are then stored in the statistical data table 34 along with the bit pattern of row 52.

Referring still to FIG. 7, at process block 50' executed in parallel with process block 48' above described, the statistical data for the current address range 22 is obtained from statistical data table 34. The bit pattern of row 52 previously stored therein is loaded into the corresponding row of the previous subblock use table 66 and corresponding row of the subblock use table 32 is set to zero.

Further at decision block 50', the fetch size value 84 is evaluated and if it is equal to zero indicating that there is very little match between the pattern of subblock use over different loadings of the block 20 associated with the given address range, then at decision block 90, the cache control circuitry 18" loads the entire block 20 of the memory address range 22 into the cache 16.

On the other hand, if there is a strong correlation in pattern exhibited, then at process block 92, the pattern from the statistical data table 34 now stored in previous subblock use table 66 is used to fetch the discontinuous subblocks 24 of that pattern (the subblocks having corresponding one values in the row of the previous subblock use table 66) minimizing traffic between the memory 14 and the cache 16. If this pattern does not include the subblock 24 holding the requested data, that subblock 24 is added to the data fetched.

Alternatively, a hierarchy may be established in which the counter 78 is first examined to decide between loading the entire block 20 or the subblock 24 of the pattern and counter 59 described above is examined to decide between loading the pattern for an individual subblock. Other hierarchies and methods of selecting between fetched data increments may also be used.

The incrementing or decrementing of counter 78 is performed only once for each cycle of evicting data from the cache 16. Thus over the course of many loadings of a particular address range 22 into a block 20, the counter 78 will track average statistics of block 20.

It is specifically intended that the present invention not be limited to the embodiments and illustrations contained herein, but modified forms of those embodiments including portions of the embodiments and combinations of elements of different embodiments as come within the scope of the following claims. In particular, although only two levels of fetch block size are shown, i.e., fetching a single subblock or fetching an entire block, or fetching an entire block or a pattern of discontinuous block, it will be understood that the present principles may be extended to multiple levels allowing, for example, subblock, multiple subblocks or entire block fetching depending on the value of the counter. Further, more complex or simpler historical tracking of the use data may be possible and in particular tracking systems which ignore the address ranges or use a proxy for such address ranges eliminating the need for storing extensive historical data.

We claim:

1. A cache structure for a computer having a processor and associated memory, the cache structure comprising:

a cache communicating with the memory for loading data therefrom and communicating with the processor for providing data thereto, the cache divided into blocks each holding data from the memory associated with different address ranges of the memory, each block divided into subblocks;

miss processing circuitry responding to a request from the processor for data of a given subblock not in the cache by loading a variable number of subblocks into the cache, including those not currently requested by the processor, as determined by a fetch size value;

tag memory having entries indicating which subblocks have been loaded into the cache;

a subblock use table having entries indicating which subblocks loaded by the miss processing circuitry but not holding data requested by the processor at the time of their loading have had their data provided to the processor after the subblocks were loaded; and a fetch size controller providing the fetch size value based on the subblock use table.

2. The cache structure of claim 1 wherein the fetch size value is stored as a single bit and wherein the number is selected from the group consisting of one subblock and all the subblocks of a block.

3. The cache structure of claim 1 wherein the fetch size controller determines the fetch size value by comparing the number of subblocks having their data provided to the processor since the time of their loading against a predetermined threshold.

4. The cache structure of claim 3 wherein the fetch size controller determines the fetch size value for a given address range based on the subblock use table for data previously loaded from the given address range for several previous loadings of the given address range.

5. The cache structure of claim 4 wherein the fetch size controller determines the fetch size value for a given address range based on whether the number of subblocks having their data provided to the processor since the time of their loading, principally exceeded or fell short of a predetermined threshold for a predetermined number of previous loadings of the given address range.

6. The cache structure of claim 1 wherein the fetch size controller provides a counter and fetch bit for each address range and wherein (i) the counter is incremented to no greater than a maximum value when the number of subblocks having their data provided to the processor since the subblocks were last loaded is greater than a predetermined threshold; and wherein (ii) the counter is decremented to no less than a minimum value when the number of subblocks having their data provided to the processor since the subblocks were last loaded is not greater than a predetermined threshold; and wherein the fetch size value indicates that the number of subblocks to be loaded by the miss processor is all of the subblocks of a block if the counter is at the maximum value and that the number of subblocks to be loaded by the miss processor is one of the subblocks of the block if the counter is not at the maximum value.

7. A cache structure for a computer having a processor and associated memory, the cache structure comprising:

a cache communicating with the memory for loading data therefrom and communicating with the processor for providing data thereto, the cache divided into blocks holding data from the memory associated with different address ranges of the memory, each block divided into subblocks;

miss processing circuitry responding to a request from the processor for data of a given address range not in the cache by loading into the cache a variable number of subblocks, including those not in the request, by the processor according to a fetch pattern;

tag memory having entries indicating which subblocks have been loaded into the cache;

a subblock use table having at least one entry indicating which of the subblocks loaded by the miss processing circuitry but not holding data requested by the processor at the time of their loading have had their data provided to the processor after the subblock was loaded;

a fetch pattern controller analyzing patterns of subblock use indicated by the subblock use table to provide the fetch pattern.

8. The cache structure of claim 7 wherein the fetch pattern is the pattern of the entry of the subblock use table associated with the given address range including a subblock holding the requested data.

9. The cache structure of claim 7 including further:

a previous subblock use table having at least one entry indicating which of the subblocks have had their data provided to the processor since the subblocks were second to last loaded; and wherein the fetch pattern controller compares the pattern of subblock use between the subblock use table and the previous subblock use table for a given address range to determine the fetch pattern.

10. The cache structure of claim 9 wherein the fetch pattern controller evaluates the hamming distance between the entries of the subblock use table and the previous subblock use table and compares that hamming distance to a predetermined threshold in determining the fetch pattern.

11. The cache structure of claim 9 wherein the fetch pattern controller determines the fetch pattern for a given address range based on a comparison of the pattern of subblock use between the subblock use table and the previous subblock use table for a given address range for several previous loadings of the given address range.

12. The cache structure of claim 11 wherein the fetch pattern is the pattern of the entry of the subblock use table associated with the given address range including a subblock holding the requested data.

13. The cache structure of claim 10 wherein the fetch pattern controller determines the fetch size value for a given address range based on whether the hamming distance principally exceeded or fell short of a predetermined threshold for a predetermined number of previous loadings of the given address range.

14. The cache structure of claim 10 wherein the fetch pattern controller provides a counter and a pattern fetch bit for each address range and wherein (i) the counter is incremented to no greater than a maximum value when the hamming distance associated with the previous subblock use table and subblock use table since the subblocks were last loaded is greater than a predetermined threshold; and wherein (ii) the counter is decremented to no less than a minimum value when the hamming distance associated with the previous subblock use table and subblock use table since the subblocks were last loaded is not greater than a predetermined threshold; and wherein the fetch pattern indicates the pattern of the entry of the subblock use table associated with the given address range including a subblock holding the requested data if the counter is not at the maximum value and an entire block of subblocks if the counter is at the maximum value.

* * * * *